(12) United States Patent
Jones et al.

(10) Patent No.: US 9,125,055 B1
(45) Date of Patent: *Sep. 1, 2015

(54) SYSTEMS AND METHODS FOR AUTHENTICATING USERS ACCESSING UNSECURED WIFI ACCESS POINTS

(71) Applicant: Bridgewater Systems Corp., Ottawa (CA)

(72) Inventors: D. Mark Jones, Ottawa (CA); Eamonn Garry, Manotick (CA)

(73) Assignee: Bridgewater Systems Corp., Ottawa (CA)

( * ) Notice: Subject to any disclaimer, the term of this patent is extended or adjusted under 35 U.S.C. 154(b) by 131 days.

This patent is subject to a terminal disclaimer.

(21) Appl. No.: 13/919,942

(22) Filed: Jun. 17, 2013

Related U.S. Application Data

(62) Division of application No. 13/363,497, filed on Feb. 1, 2012, now Pat. No. 8,495,714.

(60) Provisional application No. 61/509,799, filed on Jul. 20, 2011.

(51) Int. Cl.
*H04W 12/06* (2009.01)
*H04L 29/06* (2006.01)

(52) U.S. Cl.
CPC .................................. *H04W 12/06* (2013.01)

(58) Field of Classification Search
CPC ..... H04W 12/06; H04W 12/08; H04W 12/12; H04W 12/00; H04W 4/02; H04W 4/003; H04W 4/24; H04W 8/005; H04W 8/04; H04W 8/08; H04L 63/08; H04L 63/083; H04L 29/08072; H04L 29/06; H04L 12/06; H04L 63/162; H04L 84/12; H04L 88/08

USPC ........... 726/1–7; 709/203, 217–219, 225–229
See application file for complete search history.

(56) References Cited

U.S. PATENT DOCUMENTS

| | | | |
|---|---|---|---|
| 7,233,997 B1 | 6/2007 | Leveridge et al. | |
| 7,342,906 B1 * | 3/2008 | Calhoun | 709/229 |
| 7,965,842 B2 * | 6/2011 | Whelan et al. | 380/247 |
| 8,767,526 B1 * | 7/2014 | Jagannatharao et al. | 370/216 |
| 2002/0174335 A1 * | 11/2002 | Zhang et al. | 713/168 |

(Continued)

FOREIGN PATENT DOCUMENTS

CA          2337414          8/2001

*Primary Examiner* — Catherine Thiaw
(74) *Attorney, Agent, or Firm* — Zilka-Kotab, PC

(57) ABSTRACT

Systems and methods system for a user accessing an unsecure Wifi access point are provided. In an embodiment, the present invention requests that the customer perform authentication of the access point to which he is connected. On initial connection to the access point, the customer provides his username/password and chooses a memorable information element (e.g., image or phrase). A site specific cookie is delivered to the customer device after a successful authentication. On subsequent connections, the site specific cookie is validated and the MAC address of the customer device is used to retrieve the memorable information element. If the customer recognizes his memorable image, he confirms that he is on a bona fide access point. In a further embodiment, if the customer connects at a location and/or time of day which breaks a previously observed pattern, MAC authentication is not accepted and a full authentication (e.g., user/password) is required.

7 Claims, 6 Drawing Sheets

(56) References Cited

U.S. PATENT DOCUMENTS

| | | |
|---|---|---|
| 2003/0051170 A1* | 3/2003 | Spearman .................... 713/201 |
| 2005/0086346 A1 | 4/2005 | Meyer |
| 2006/0002334 A1* | 1/2006 | Washburn, III .............. 370/328 |
| 2006/0114863 A1* | 6/2006 | Sanzgiri et al. .............. 370/338 |
| 2006/0271485 A1* | 11/2006 | McKenzie et al. ............. 705/51 |
| 2008/0066157 A1* | 3/2008 | Stevens et al. ................... 726/4 |
| 2008/0155661 A1* | 6/2008 | Arashin et al. ................... 726/4 |
| 2009/0158400 A1* | 6/2009 | Miyake .............................. 726/4 |
| 2010/0107225 A1* | 4/2010 | Spencer et al. ................... 726/4 |
| 2010/0216429 A1* | 8/2010 | Mahajan ....................... 455/411 |
| 2010/0235882 A1* | 9/2010 | Moore .............................. 726/3 |
| 2011/0196977 A1* | 8/2011 | Lynch et al. .................. 709/229 |
| 2011/0243058 A1* | 10/2011 | Yamada ........................ 370/315 |

* cited by examiner

SYSTEMS AND METHODS FOR AUTHENTICATING USERS ACCESSING UNSECURED WIFI ACCESS POINTS

CROSS REFERENCE TO RELATED APPLICATIONS

The present application is a divisional of U.S. application Ser. No. 13/363,497, filed Feb. 1, 2012, which claims priority to U.S. Provisional Patent Application No. 61/509,799, entitled Systems and Methods for Authenticating Users Accessing Unsecured WiFi Access Points, filed on Jul. 20, 2011 by Jones et al., which are hereby expressly incorporated by reference in their entirety.

BACKGROUND OF THE INVENTION

1. Field of the Invention

The present invention relates generally to mobile communications networks, and specifically to accessing unsecured WiFi access points, commonly referred to as hotspots.

2. Background Art

The rapid and widespread success of mobile broadband services has sparked exponential growth in mobile communications services and mobile data traffic. This traffic boom is driven by the popularity of smartphones, electronic book readers, laptop data cards and the like that have stimulated a dramatic increase in the number of mobile subscribers and their use of advanced applications such as, for example, mobile Internet browsing, video services, gaming, online banking, online bill paying and location-based services. As advanced applications have grown more common, individuals have increasingly exchanged private and highly valuable information, such as, bank account information, utility account information, investment information, social network information and associated usernames and passwords) over wireless connections. Individuals increasingly seek access to their online accounts anywhere and at anytime through their mobile devices, such as smartphones and laptops. In order to serve the needs of individuals, service providers have increasingly deployed WiFi access points, commonly referred to as hotspots.

WiFi is a wireless standard based on the IEEE 802.11 series of standards for specifying how an electronic device connects to the Internet via a wireless network access point or hotspot. Access points or hotspots are devices that allow wireless devices to connect to a network. Hotspots have a limited range, typically in the range of 20 to 100 meters, but often support even larger ranges. However, multiple overlapping access points can cover large areas. There are hundreds of millions of users that access wireless networks via WiFi hotspots, and millions of hotspots have been deployed worldwide in airports, cafes, restaurants, libraries, hotels and in many other types of locations.

Individuals desire to access wireless networks through WiFi hotspots in a simple and efficient manner. As a result, operators seek to make accessing WiFi hotspots as simple as possible. At odds with these two objectives, criminals often seek to steal user account information and access user accounts for a wide variety of criminal mischief. Generally speaking, the easier it is for a user to access a WiFi hotspot, the easier it will be for a criminal to steal user access information and hijack a user account.

While there are some existing approaches for authorizing access to network resources, existing approaches do not address security measures to reduce criminal mischief as described above. For example, Canadian Patent Application No.: 2,337,414, entitled, "Service Sign on For Computer Communication Networks", filed by Tang (Tang) discloses a service sign-on method for a network having a connectionless protocol that provides user authentication, controlled access to network services, and facilitates network utilization records keeping. U.S. Published Patent Application No.: 2005/0086346, entitled, "Access Point Coupling Guests to Internet", filed by Meyer (Meyer) focuses on authenticating and authorizing guests accessing Internet services via wireless transmissions with an access point. And U.S. Pat. No. 7,233,997, filed by Leveridge et. al. (Leveridge), describes a method of operating an authenticating server system for authenticating users at client terminals connected via a data communications network to control access to a document stored on a resource server. Tang, Meyer, and Leveridge each fail to address security methods to reduce criminal mischief to prevent hijacking a user account and stealing user access information.

Industry has developed a variety of standards, such as, for example, IEEE 802.1x, WISPR 2.0, and IEEE 802.11u/HotSpot 2.0, to provide security measures when accessing WiFi hotspots. IEEE 802.1x provides a mutual authentication using extended authentication protocol (EAP). IEEE 802.1x requires configuration of a connection manager and cross platform support is often considered cost prohibitive. Wireless Internet Service Provider roaming (WISPR) 2.0 is a newer standard, and is not widely deployed. WISPR 2.0 also requires a new connection manager and additionally requires the deployment of network servers. IEEE 802.11u/Hotspot 2.0 is a new standard that is unproven and not yet deployed. This approach requires a new connection manager, and additionally special access points and network servers. Each of these security standards provide enhanced security to prevent criminals from stealing information transferred when a user device is accessing a wireless network. Unfortunately, these standards are expensive to implement and create burdens for a user to access a WiFi hotspot. As a result, many user devices and WiFi hotspots do not employ these security standards, and are unsecured, providing easy user access, but also affording an opportunity for criminals to easily steal customer access and account login information.

What is needed are systems and methods that provide easy access to WiFi hotspots for users, while affording security measures that reduce the ability of criminals to steal user account and login information.

BRIEF SUMMARY OF THE INVENTION

The present invention provides systems and methods for a user accessing an unsecure WiFi access point. Currently, operators do not want the operational expense of administering security software on WiFi user devices. Additionally, customers do not want to repeatedly enter their username/password on WiFi login portals. A current approach to providing security when a user accesses a WiFi access point is to store the MAC address of the WiFi user device upon an initial login, and then to validate the MAC address on subsequent logins. This approach has at least two security weaknesses. First, the user device MAC address can be sniffed over the air and spoofed by a rogue client. Second, rogue access points can phish for customer credentials.

In an embodiment, the present invention seeks to address these security weaknesses by considering user profile information including user historical characteristics, user state information and/or user subscription information to determine whether to authenticate an access request and/or to require reauthentication. This addresses the first weakness described above. Additionally, in an embodiment, the present invention employs image authentication and site cookie authentication in tandem to address the second weakness described above.

In an embodiment, the present invention requests that the customer perform authentication of the access point to which he is connected. On initial connection to the access point, the customer provides his username and/or password and chooses a memorable information element (e.g., image or phrase). A site specific cookie is delivered to the customer device after a successful authentication.

On subsequent connections, the site specific cookie is validated and the MAC address of the customer device is used to retrieve the memorable information element. If the customer recognizes his memorable image, he confirms that he is on a bona fide access point. In a further embodiment, if the customer connects at a location and/or time of day which breaks a previously observed pattern, MAC authentication is not accepted and a full authentication (e.g., user/password) is required.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form, a part of the specification, illustrate the present invention and, together with the description, further serve to explain the principles of the invention and to enable a person skilled in the pertinent art to make and use the invention.

Figure 1:
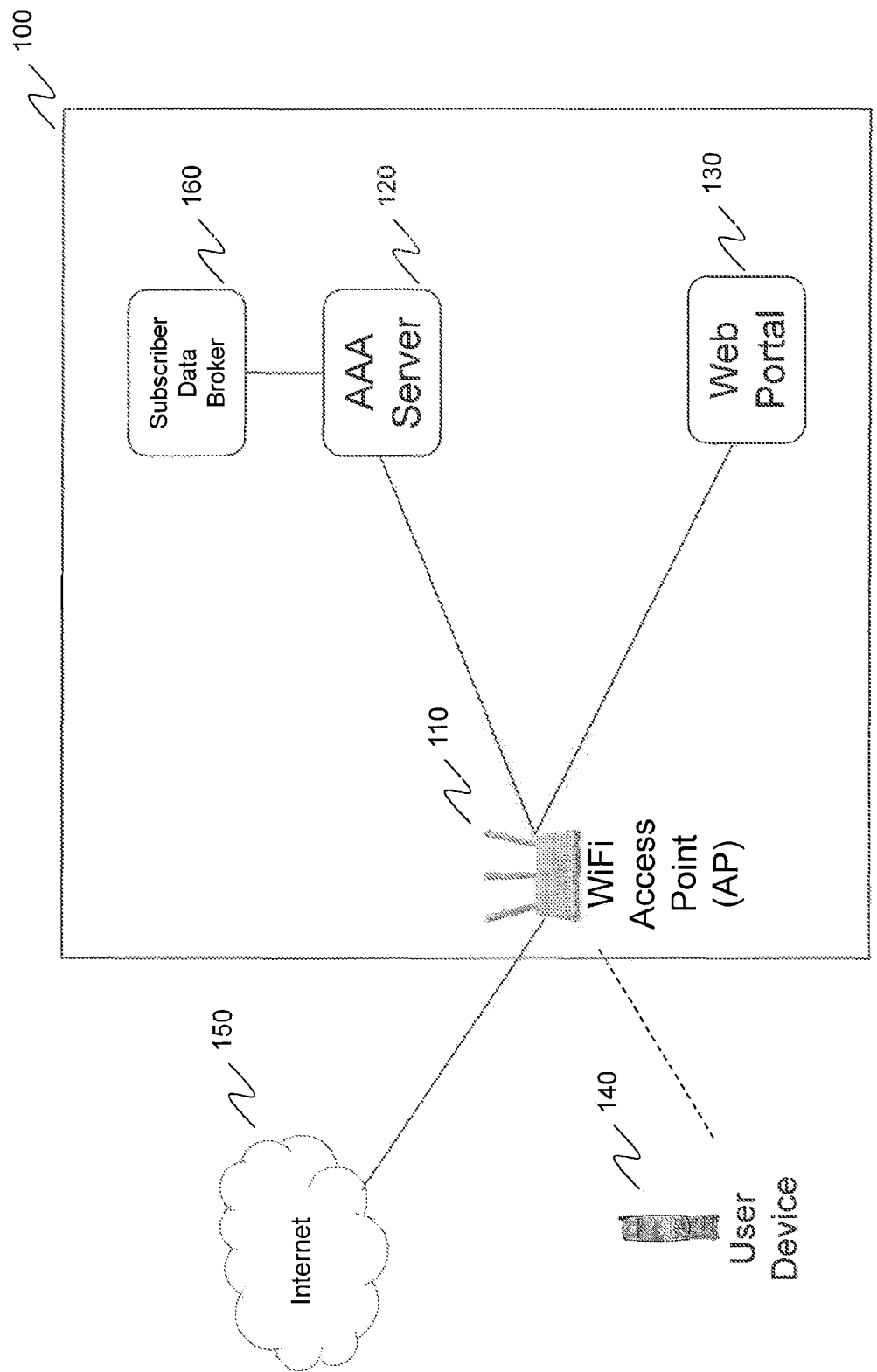
FIG. 1 provides a network diagram of a WiFi access authentication system, according to an embodiment of the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

FIG. 1 provides a network diagram of WiFi access authentication system 100, according to an embodiment of the invention. WiFi access authentication system 100 provides a system that enables a user to access an unsecured WiFi access point using simple and efficient methods for authenticating the user. WiFi access authentication system includes WiFi access point 110, AAA (Authentication, Authorization, and Accounting) server 120 and web portal 130. User device 140 seeks to gain access to Internet 150 through WiFi access point 110.

User device 140 includes, but is not limited to, a smartphone, a laptop computer, an electronic book reader, a tablet computer or any other electronic device that has the ability to communicate wirelessly. AAA server 120 includes, but is not limited to, RADIUS and DIAMETER-based AAA servers. While the invention is discussed in the context of WiFi wireless standards, the invention is not limited to only WiFi access points. As will be known by an individual skilled in the art and based on the teachings herein, the present invention can be extended to user devices accessing other types of wireless access points.

In embodiments, WiFi access authentication system also includes a subscriber data broker 160. Alternatively, the data or portions of the data contained within subscriber data broker 160 are included within AAA server 120. In an embodiment, subscriber data broker 160 includes or relies upon three types of databases providing different types of static and dynamic subscriber information. These are a subscriber profile database, a state database and a usage database. While discussed separately, the information within these databases can be stored in any combination of databases—from one to many.

The subscriber profile database includes information about subscribers, such as their service package, historical usage patterns, historical location information and patterns, billing and payment characteristics, and service preferences, for example.

The state database includes state information that identifies and defines network sessions, which are tied to subscribers. The state database provides real-time subscriber awareness and context that is critical to effectively managing customer experiences and meeting increasingly high user expectations for service quality and delivery. The state database primarily includes transactional data, and contains mostly transient data. For example, session data is typically created and deleted when a subscriber starts and stops using a service (like placing a call, or watching a video), and may be Modified throughout the session.

In embodiments, the state database includes information about the network, such as the IP address that the subscriber is currently using and what network the subscriber is currently connected to. Additionally, the state database includes device information, such as the device being used and the version of software, which enables multimedia applications to optimize the quality of the delivered content and services based on the device being used. The state database also includes information about the subscriber, including location, if the subscriber is roaming, and services being used or requested. Unique data information that is provided by the network, but not necessarily covered by industry standards may also be stored. This information can be used in many ways based on service-provider specific architectures. In embodiments, the state database includes any combination of the above state information.

The usage database provides data required by operators to generate billing information, audit transactions and reconcile statements from operators. This transactional data is stored in the usage database.

Figure 2A:
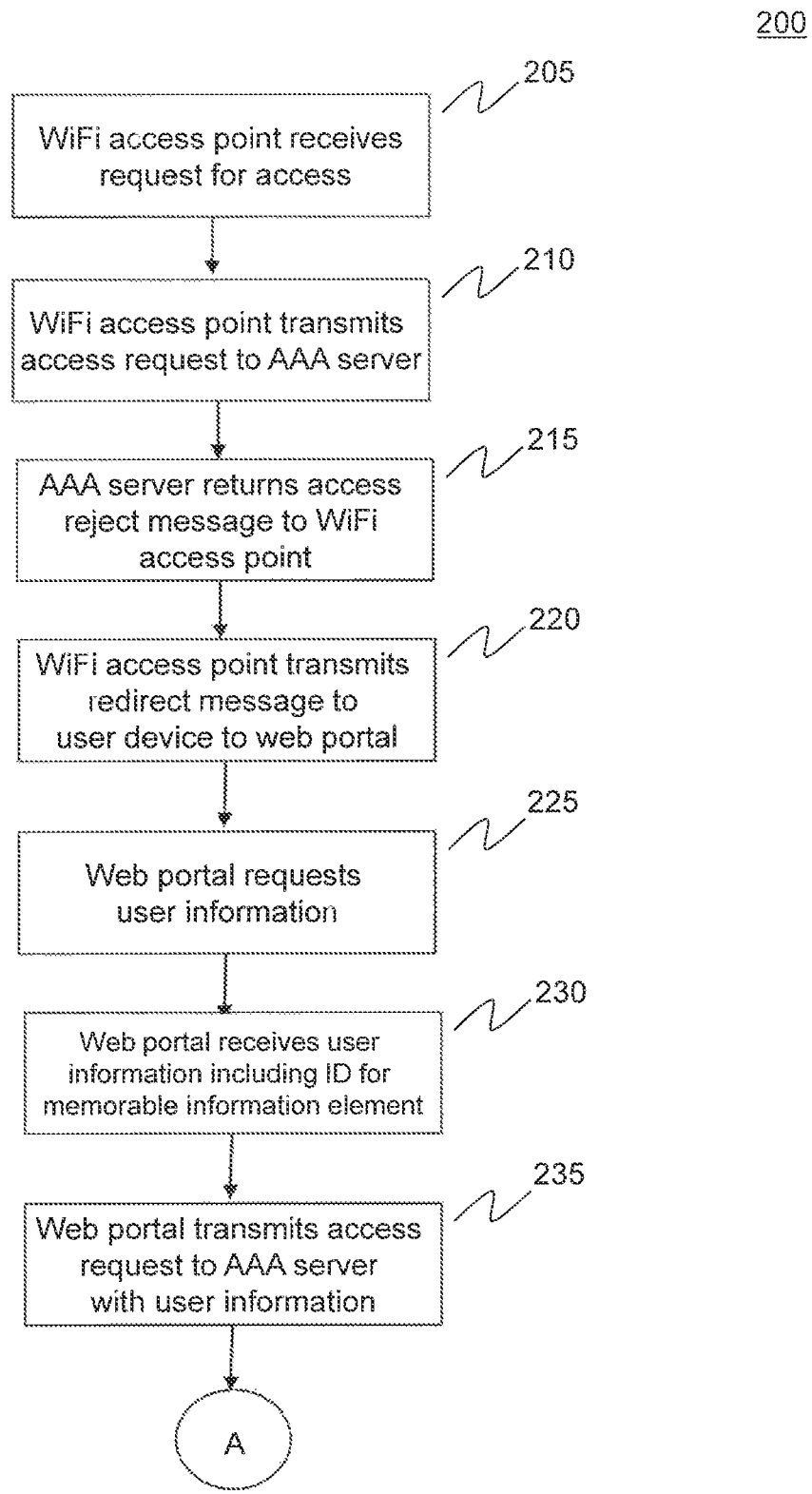
FIGS. 2A and 2B provide a method for accessing a WiFi access point on an initial login, according to an embodiment of the invention.
Figure 2B:
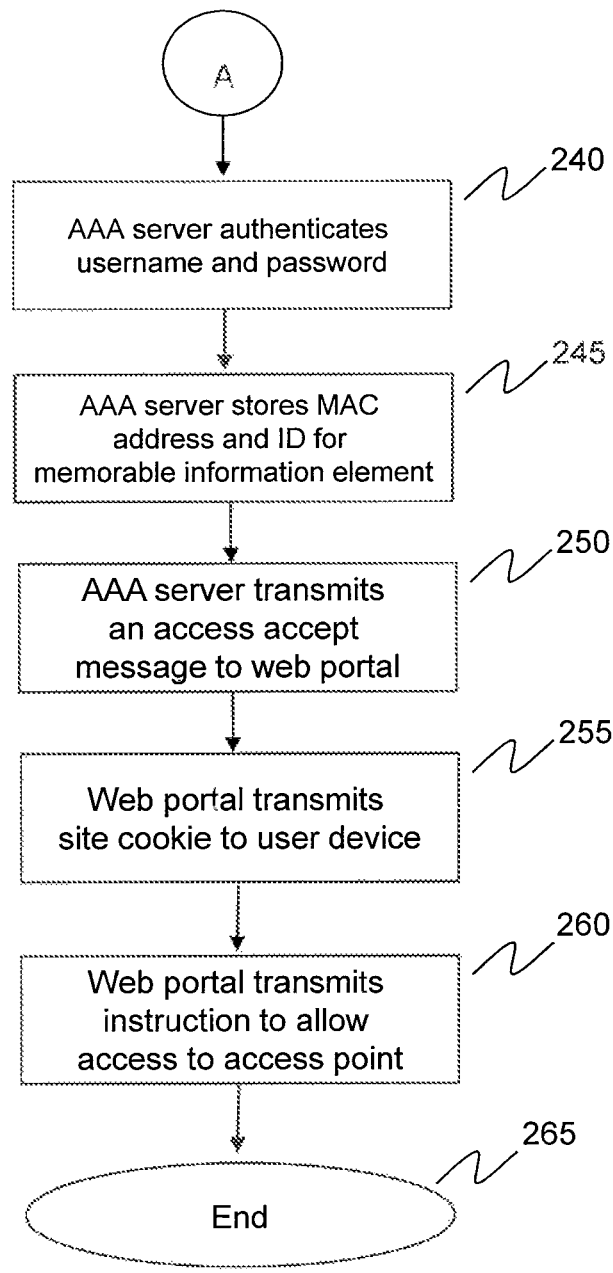

FIGS. 2A and 2B provides a method 200 for authenticating a user accessing an unsecure WiFi access point upon an initial login to the access point, according to an embodiment of the invention. Method 200 begins in step 205. In step 205, a WiFi access point, such as WiFi access point 110, receives a request from a user device, such as user device 140, to access the WiFi access point. In step 210 the WiFi access point transmits an access request including the MAC address of the user device to a AAA server, such as AAA server 120. As this is the initial login of the user device to the AAA server, the MAC address is currently unauthorized.

In step 215, because the MAC address is currently unauthorized, the AAA server returns an access reject message to the WiFi access point. Upon receipt of the access reject message, in step 220 the WiFi access point transmits a redirect message to the user device redirecting the user device to a web portal, such as web portal 130. In step 225, the web portal requests a username, password and selection of a memorable information element. In embodiments, the memorable information element includes one or more of an image, phrase, or question and answer.

In step 230, the web portal receives a username, password and selection of a memorable information element. In step 235, the web portal transmits an access request message to the AAA server containing the username, password, MAC address and the identifier of the memorable information element. In step 240, the AAA server authenticates the user name and password. Additionally, in step 245 the AAA server stores the MAC address and the identifier of the memorable information element.

In an embodiment, the AAA server also establishes and stores a timer for the identifier. Upon expiry of the identifier timer, the AAA server expires or deletes the identifier from the memorable information element. In this case any subsequent login to the WiFi access point would be treated as an initial login. The duration of the timer can be established based on a wide variety of factors, including, but not limited to, location of the WiFi access point (e.g., is the access point located in an area likely to have fraudulent activity? in which case a short duration timer would be provided), characteristics of the user, time of day, number of users accessing the WiFi access point, etc.

In an embodiment, the AAA server accesses a subscriber data broker, such as subscriber data broker 160 to obtain user profile, state or usage information. The AAA server compares a current user condition with the historical user profile information to generate comparison results. For example, the AAA server may compare the user's current location to a known previous location. The AAA server then evaluates comparison results against established criteria to determine an authentication action. For example, the AAA server may determine that the current location is too far away from the previous location in the time elapsed from when the user device was at the previous location. In such a case, the AAA server would recognize a potential fraudulent situation, and deny access, require additional security measures and/or take a security notification action to alert the network operator of potentially fraudulent activity.

As will be understood by reference to the types of databases accessed through subscriber data broker 160, analysis of a wide variety of user profile, state and usage information can be used to enhance security. For example, location, user time of day usage patterns, and user usage patterns can be analyzed.

In step 250, the AAA server transmits to the web portal an access accept message. In step 255, the web portal transmits to the user device a site cookie. The site cookie is intended to prevent someone from using MAC spoofing to obtain the memorable information element and using it to phish the customer.

In the absence of the use of a site cookie, a criminal could sniff for MAC addresses and steal user credentials. For example, a criminal could set up his laptop to sniff for MAC addresses of users accessing a WiFi access point in a coffee shop. Later in the day (presumably after the users have left), the criminal could return to the coffee shop. The criminal sets up his laptop MAC addresses to the ones sniffed earlier in the day and notes the memorable images displayed for each MAC address. On the next day, the criminal returns to the coffee shop and sets up a phishing web portal that shows the memorable images for the known MAC addresses sniffed the day before, and requests the uses to enter their credentials. Upon entry of the credentials by the users, the criminal then can gain access to the users' accounts.

In an embodiment, the site cookie includes a hashed site cookie including the MAC address, the identifier of the memorable image element and a portal key. Specifically, in an embodiment the site cookie includes a Hash-based Message Authentication Code (HMAC) where the hash input message includes the MAC address, the identifier of the memorable image element, and the hash key is the private key of the web portal. Additionally, in another embodiment the cookie includes a cookie expiry timestamp as part of the hash input message to further enhance security.

In step 260, the web portal transmits an instruction to the access point to allow the user to access the WiFi access point. In step 265, method 200 ends.

Figure 3A:
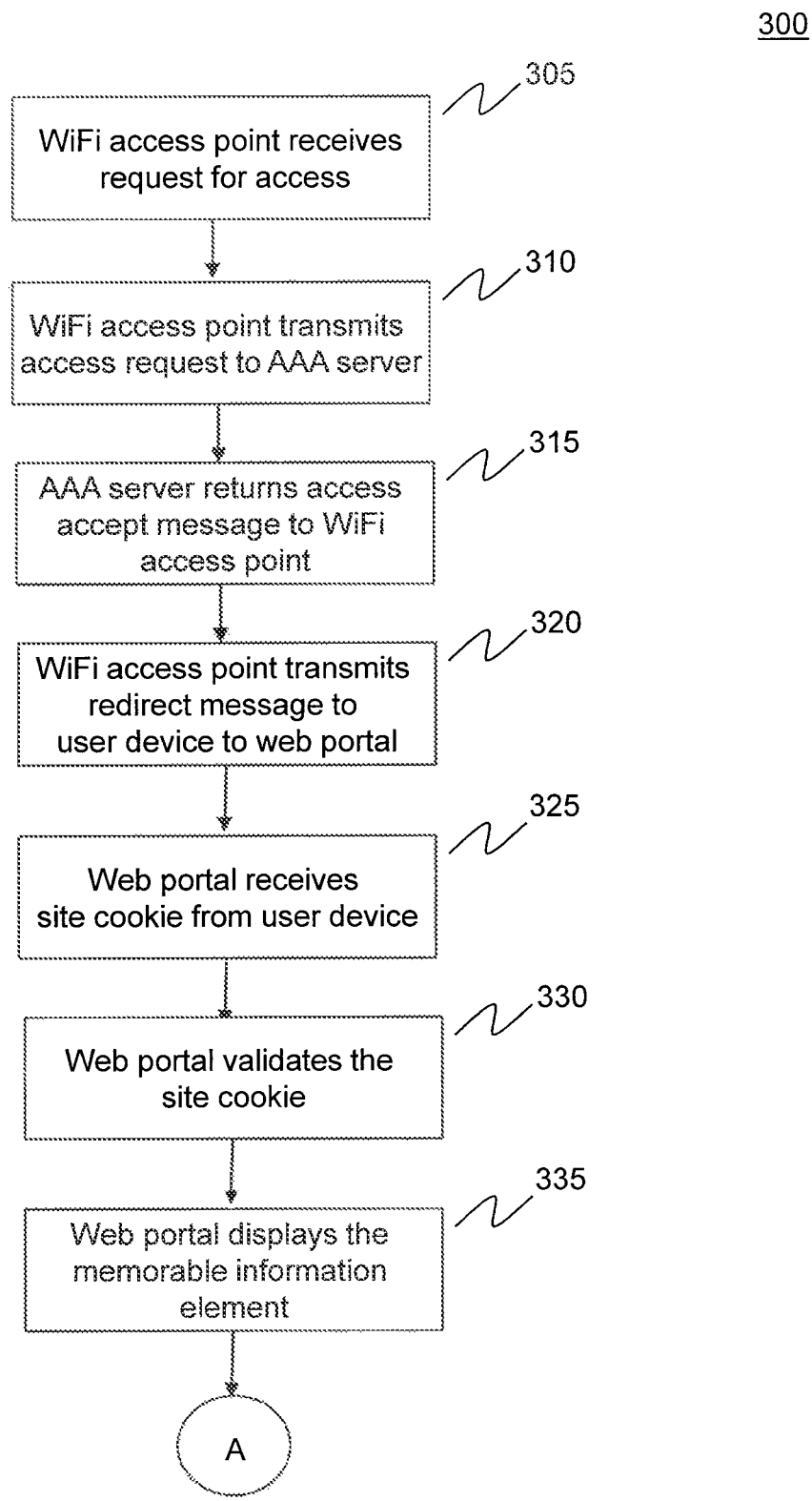
FIGS. 3A and 3B provides a method for accessing a WiFi access point on subsequent logins, according to an embodiment of the invention.
Figure 3B:
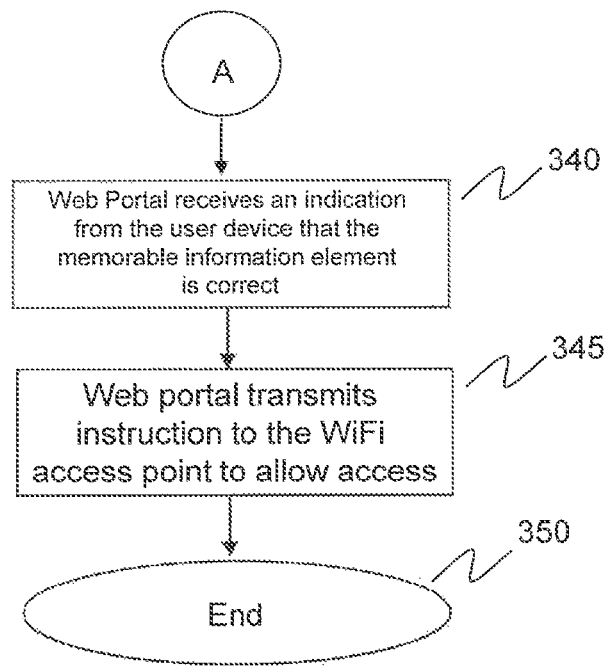

FIGS. 3A and 3B provides a method 300 for authenticating a user accessing an unsecure WiFi access point upon a subsequent login after an initial login to the access point, as described in method 200 above, according to an embodiment of the invention. Method 300 begins in step 305.

In step 305, a WiFi access point, such as WiFi access point 110 receives a request from a user device, such as user device 140 to access the WiFi access point. In step 310 the WiFi access point transmits an access request including the MAC address of the user device to a AAA server, such as AAA server 120. As this is a subsequent login of the user device to the AAA server, the MAC address is currently authorized.

In step 315, because the MAC address is currently authorized, the AAA server return an access accept message to the WiFi access point. The access accept message includes the identifier of the memorable information element.

In an embodiment, the AAA server accesses a subscriber data broker, such as subscriber data broker 160 to obtain user profile, state or usage information. The AAA server compares a current user condition with the user profile information to generate comparison results. For example, the AAA server may compare the user's current location to a known previous location. The AAA server then evaluates comparison results against established criteria to determine an authentication action. For example, the AAA server may determine that the current location is too far away from the previous location in the time elapsed from when the user device was at the previous location. In such a case, the AAA server would recognize a potential fraudulent situation, and deny access, require additional security measures and/or take a security notification action to alert the network operator of potentially fraudulent activity.

As will be understood by reference to the types of databases accessed through subscriber data broker 160, analysis of a wide variety of user profile, state and usage information can be used to enhance security. For example, location, user time of day usage patterns and user usage patterns can be analyzed.

In step 320, the WiFi access point transmits a redirect message to the user device directing the user device to the web portal. In step 325, the web portal receives the site cookie from the user device. In step 330 the web portal validates the site cookie. In step 335, the web portal displays the memorable information element associated with the identifier for the memorable information element. In step 340, the web portal receives an indication from the user device that the memorable information element is the correct memorable information element. In step 345, the web portal transmits an instruction to the WiFi access point to allow the user device to access the WiFi access point. In step 350, method 300 ends.

Computer System Implementation

Figure 4:
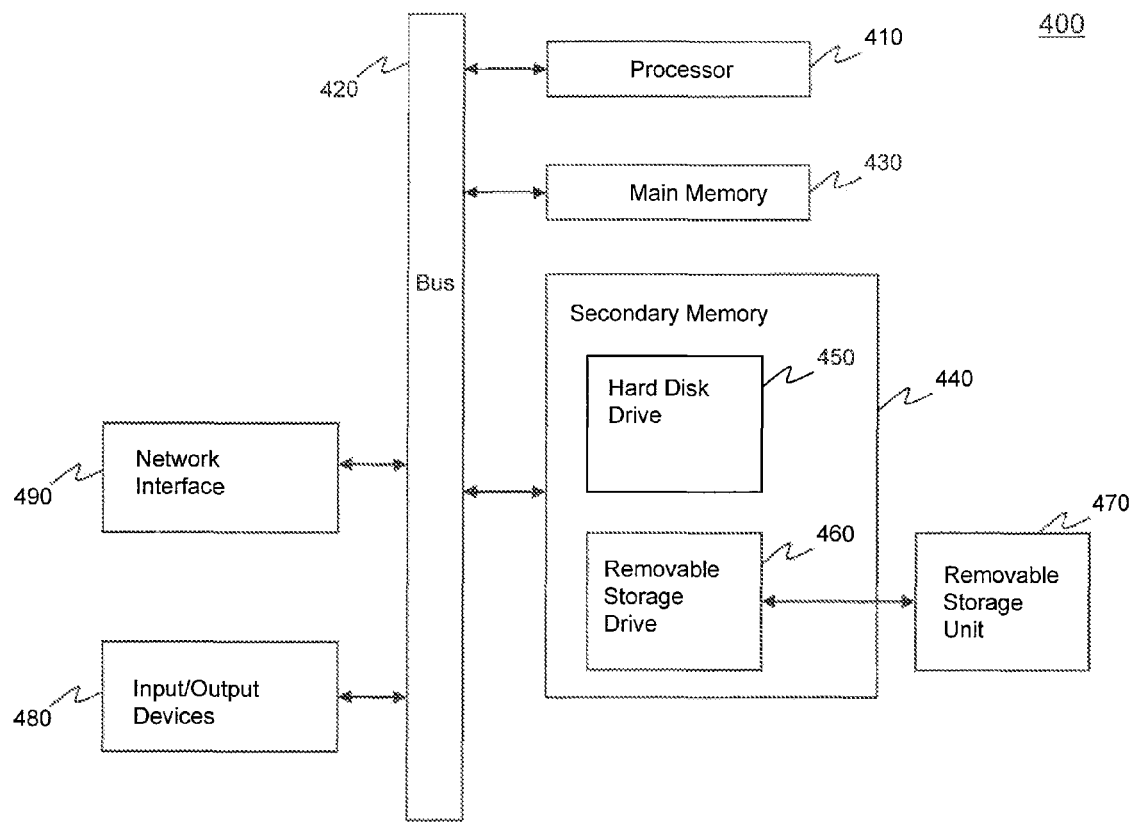
FIG. 4 is a diagram of a computer system on which the methods and systems herein described can be implemented, according to an embodiment of the invention.

In an embodiment of the present invention, the methods and systems of the present invention described herein are implemented using well-known computers, such as a computer 400 shown in FIG. 4. The computer 400 can be any commercially available and well-known computer capable of performing the functions described herein, such as computers available from Apple, Sun, HP, Dell, etc.

Computer 400 includes one or more processors (also called central processing units, or CPUs), such as processor 410. Processor 410 is connected to communication bus 420. Computer 400 also includes a main or primary memory 430, preferably random access memory (RAM). Primary memory 430 has stored therein control logic (computer software), and data.

Computer 400 may also include one or more secondary storage devices 440. Secondary storage devices 440 include, for example, hard disk drive 450 and/or removable storage device or drive 460. Removable storage drive 460 represents a magnetic tape drive, a compact disk drive, an optical storage device, tape backup, ZIP drive, JAZZ drive, etc.

Removable storage drive 460 interacts with removable storage unit 470. As will be appreciated, removable storage drive 460 includes a computer usable or readable storage medium having stored therein computer software (control logic) and/or data. Removable storage drive 460 reads from and/or writes to the removable storage unit 470 in a well-known manner.

Removable storage unit 470, also called a program storage device or a computer program product, represents a magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 400, or multiple computer 400s to perform any combination of the functions described herein.

Computer programs (also called computer control logic) are stored in main memory 430 and/or the secondary storage devices 440. Such computer programs, when executed, direct computer 400 to perform the functions of the present invention as discussed herein. In particular, the computer programs, when executed, enable processor 410 to perform the functions of the present invention. Accordingly, such computer programs represent controllers of the computer 400.

Computer 400 also includes input/output/display devices 480, such as monitors, keyboards, pointing devices, etc.

Computer 400 further includes a communication or network interface 490. Network interface 490 enables computer 400 to communicate with remote devices. For example, network interface 490 allows computer 400 to communicate over communication networks, such as LANs, WANs, the Internet, etc. Network interface 490 may interface with remote sites or networks via wired or wireless connections. Computer 400 receives data and/or computer programs via network interface 490. The electrical/magnetic signals having contained therein data and/or computer programs received or transmitted by the computer 400 via network interface 490 also represent computer program product(s).

CONCLUSION

The invention can work with software, hardware, and operating system implementations other than those described herein. Any software, hardware, and operating system implementations suitable for performing the functions described herein can be used.

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for authenticating a user device accessing an unsecure WiFi access point, comprising:
   receiving by a server from the unsecure WiFi access point a first access request including a media access control (MAC) address of the user device;
   when it is determined by the server that the MAC address is unknown:
      returning an access reject message by the server to the unsecure WiFi access point,
      receiving by the server from a web portal a second access request associated with the first access request including a username associated with the user device, a password associated with the user device, the MAC address of the user device, and an identifier for a memorable information element, including one or more of an image and a phrase,
      authenticating by the server the username and password from the second access request,
      storing by the server the MAC address and the identifier for the memorable information element, and
      returning by the server to the web portal an access accept message indicating that the user has been authenticated; and
   when it is determined that the MAC address is known:
      authenticating by the server the first access request,
      determining by the server the identifier for the memorable information element for the user that is stored at the server, and
      returning by the server to the unsecure WiFi access point an access accept message including the identifier for the memorable information element.

2. The method of claim 1, further comprising:
   accessing subscriber profile and state information to obtain historical user profile and current user information;
   comparing a current user condition with the historical user profile information to generate comparison results; and
   evaluating the comparison results against established criteria to determine an authentication action.

3. The method of claim 2, wherein subscriber profile and state information include one or more of user location, user time of day usage pattern, and user usage patterns.

4. The method of claim 1, wherein storing the MAC address and the identifier for the memorable information element further includes storing an identifier timer.

5. The method of claim 4, further comprising upon expiry of the identifier timer expiring the identifier for the memorable information element.

6. The method of claim 4, further comprising setting a duration of the identifier timer based on one or more of a location of the unsecure WiFi access point, user characteristics, time of day and/or number of users accessing the unsecure WiFi access point.

7. The method of claim 1, wherein the memorable information element includes one or more of a memorable image, a memorable phrase or a memorable question/answer.

\* \* \* \* \*